United States Patent [19]

Nishimura

[11] Patent Number: 4,984,604
[45] Date of Patent: Jan. 15, 1991

[54] RUBBER HOSE
[75] Inventor: Kazuhiko Nishimura, Kasugai, Japan
[73] Assignee: Tokai Rubber Industries, Ltd., Aichi, Japan
[21] Appl. No.: 465,889
[22] Filed: Jan. 16, 1990
[30] Foreign Application Priority Data Jan. 18, 1989 [JP] Japan ................................. 1-9400

[51] Int. Cl.⁵ ............................................. F16L 11/04
[52] U.S. Cl. ................................... 138/126; 138/125; 138/137; 138/DIG. 3; 138/DIG. 7; 428/36.91
[58] Field of Search ............... 138/118, 123, 124, 125, 138/126, 127, 137, 140, 141, 172, 174, DIG. 3, DIG. 7, 177; 428/35.7, 36.1, 36.2, 36.8, 36.9, 36.91

[56] References Cited

U.S. PATENT DOCUMENTS

| | | | |
|---|---|---|---|
| 3,835,891 | 9/1974 | White | 138/DIG. 3 |
| 4,041,207 | 8/1977 | Takada et al. | 138/137 |
| 4,196,754 | 8/1980 | Payne | 138/137 |
| 4,330,017 | 5/1982 | Satoh et al. | 138/126 |
| 4,457,799 | 7/1984 | Dunn | 138/137 |
| 4,603,712 | 8/1986 | Krause | 138/137 |
| 4,685,090 | 8/1987 | Krever | 138/137 |
| 4,802,938 | 2/1989 | Kitami et al. | 138/126 |
| 4,887,647 | 12/1989 | Igarashi et al. | 138/137 |
| 4,942,906 | 7/1990 | Igarashi et al. | 138/DIG. 3 |

Primary Examiner—James E. Bryant, III
Attorney, Agent, or Firm—Oliff & Berridge

[57] ABSTRACT

A rubber hose having an outer tube formed of a rubber material, and an inner tube located radially inwardly of the outer tube, the inner tube including an inner layer formed of a first composition containing a fluoro rubber as a major constituent thereof, and an outer layer located radially outwardly of the inner layer, the outer layer of the inner tube being formed of a second composition containing as a major constituent thereof a blend of chlorosulphonated polyethylene and polyvinyl chloride.

12 Claims, 1 Drawing Sheet

RUBBER HOSE

BACKGROUND OF THE INVENTION

1. Field of the Invention

The present invention relates in general to a rubber hose and in particular to a rubber hose suitable for use as, for example, a fuel transporting hose for a motor car engine.

2. Discussion of the Prior Art

There is known a fuel conducting or transporting rubber hose having a heat-resistant and gasoline-resistant inner tube, a weather-resistant outer tube, and a reinforcing fiber layer interposed between the inner and outer tubes. The rubber hose is connected at an end thereof to a nipple of a metallic pipe used in the engine room of a motor car, such that the hose's end is fitted on the nipple and externally tightened around the nipple with a fastening band. The inner tube of the rubber hose is formed of acrylonitrile-butadiene rubber (NBR), and the outer tube is formed of chlorosulphonated polyethylene (CSM), chlorinated polyethylene (CPE), or epichlorohydrin rubber (CHC), so that the inner and outer tubes have specified properties, specifically heat resistance, gasoline resistance and weather resistance.

Recently there is tendency that the engine room of a motor car is heated to a high temperature more than 100° C., because engine fuel is required to be pressurized and heated to high level and degree for the purpose of exhaust gas control. Hence it is required that fuel transporting rubber hoses for use in a motor car engine room have a more excellent heat resistance. In addition, there has been encountered the problem that gasoline is subjected to oxidation due to the raised engine room temperature and consequently is changed to sour gasoline containing therein peroxides. The sour gasoline causes deterioration of the rubber hoses which serve for transporting it. Thus, it is also required that the fuel transporting rubber hoses have a high resistance to sour gasoline.

There is known another fuel transporting rubber hose the inner tube of which is formed of a fluoro rubber (FKM). This rubber hose has an excellent heat resistance and an excellent sour-gasoline resistance. However, the fluoro rubber is very expensive, and accordingly the cost of manufacture of the rubber hose is very high.

In this situation it has been proposed to provide a rubber hose the inner tube of which is constituted by two layers such that an inner layer of the inner tube is formed of FKM and an outer layer thereof is formed of a cheaper material. In the case where the outer layer is formed of CHC, the produced rubber hose has an excellent heat resistance. However, the cost of production of this rubber hose is not decreased to a sufficient low level. Meanwhile, in the case where NBR is used for forming the outer layer, the production cost is lowered to an appreciable level, but the heat resistance of the rubber hose is insufficiently low. Thus, there has not been provided a rubber hose which has an excellent heat resistance and which is produced at low cost. In other words, there is a great demand for a rubber hose which satisfies the two requirements of high heat resistance and low production cost.

There is known another problem with the use of FKM, namely, it is considerably difficult to vulcanize FKM to a different material with sufficient adhesive strength therebetween. In the case of the above-indicated rubber hose whose inner tube is constituted by two layers, the rubber hose suffers from insufficient adhesive strength between the inner and outer layers of the inner tube. In other words, the rubber hose is not free from the problem of peeling at the interface between the inner and outer layers of the inner tube.

SUMMARY OF THE INVENTION

It is therefore an object of the present invention to provide a rubber hose having an inner tube which includes a layer essentially formed of a fluoro rubber (FKM), wherein the rubber hose has excellent heat resistance and excellent interlayer adhesive strength, and is manufactured at reduced cost.

The above object has been achieved by the principle of the present invention, which provides a rubber hose comprising an outer tube formed of a rubber material, and an inner tube located radially inwardly of the outer tube, the inner tube including an inner layer formed of a first composition containing a fluoro rubber as a major constituent thereof, and an outer layer located radially outwardly of the inner layer, the outer layer of the inner tube being formed of a second composition containing as a major constituent thereof a blend of chlorosulphonated polyethylene and polyvinyl chloride. The second composition may further contain acrylonitrile-butadiene rubber.

In the rubber hose constructed as described above, the innermost layer, namely, inner layer of the inner tube is formed of a composition containing a fluoro rubber (FKM) as a major constituent thereof. Thus the present rubber hose has an excellent sour-gasoline resistance, and therefore the rubber hose is suitable for use as a fuel transporting hose for a motor car engine.

In addition, the inner tube of the present rubber hose is constituted by double layers, namely, the inner and outer layers, and the inner layer is formed of the FKM-based composition so as to have a comparatively small radial thickness and the outer layer is formed of a cheaper composition containing the above-indicated polymer blend as a major constituent thereof. Thus the present rubber hose is manufactured at reduced cost, without having to sacrifice the excellent sour-gasoline resistance owing to the inner layer of the inner tube.

Moreover, the polymer blend contained in the composition for forming the outer layer of the inner tube, has a high heat resistance, so that the present rubber hose exhibits an excellent heat resistance to resist the increased heat in the engine room of a motor car. Furthermore, the polymer blend is adhered to FKM or the inner layer formed of the FKM-based composition, with sufficient adhesive strength therebetween, so that the present rubber hose is free from the problem of peeling at the interface between the inner and outer layers of the inner tube.

BRIEF DESCRIPTION OF THE DRAWINGS

The above and optional objects, features and advantages of the present invention will be better understood by reading the following detailed description of the invention when considered in conjunction with the accompanying drawing in which.

DETAILED DESCRIPTION OF THE INVENTION

Figure 1:
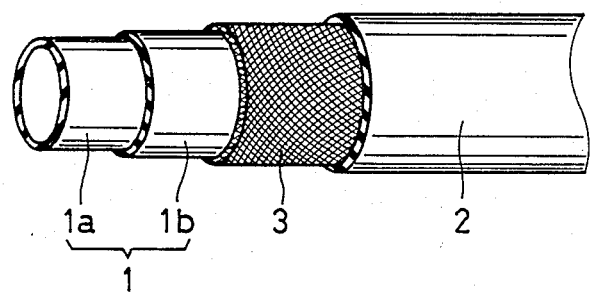
FIG. 1 is an illustrative view of a fuel transporting rubber hose embodying the present invention.

Referring to FIG. 1 there is shown a fuel transporting rubber hose embodying the present invention. In the figure reference numeral 1 designates an inner tube of the rubber hose. The inner tube 1 consists of an inner layer 1a and an outer layer 1b located radially outwardly of the inner layer 1a. The inner layer 1a is formed of a FKM-based composition which contains a fluoro rubber (FKM) as a major constituent thereof. The fluoro rubber used may be a known fluoro rubber such as a copolymerization product of vinylidene fluoride and 6-fluoropropylene, or a copolymerization product of vinylidene fluoride, 4-fluoroethylene and 6-fluoropropylene. The FKM-based composition may further contain at least one additive commonly used with FKM.

The outer layer 1b of the inner tube 1 is formed of a composition containing as a major constituent thereof a blend of chlorosulphonated polyethylene (CSM) and polyvinyl chloride (PVC), or a blend of chlorosulphonated polyethylene, polyvinyl chloride and acrylonitrile-butadiene rubber (NBR). Each of CSM, PVC, NBR thus used may be a known product. The proportion of Cl atoms in the CSM, or the proportion of acrylonitrile units in the NBR is not limited to a specific value or range. In addition, the blend ratio of the polymers in each blend is not limited to a specific value or range. However, according to the principle of the present invention it is essentially required that the composition for forming the outer layer of the inner tube, contain CSM and PVC. Furthermore, it is recommended that this composition contain 40 to 70% by weight of CSM, 25 to 60% by weight of the polymer PVC, and 0 to 25% by weight of NBR. If the content of CSM in the composition exceeds its upper limit, 70% by weight, the gasoline-resistance of the composition is lowered to an insufficient level. Meanwhile, if the content of CSM is less than its lower limit, 40% by weight, the content of the other essential PVC in the composition may exceed its upper limit, 60% by weight, so that the composition may lose its rubber characteristics, or that the hardness of the outer layer 1b formed thereof is adversely increased and consequently suffers from lowered sealing characteristic. Although NBR is not an essential constituent for the present composition, the addition thereof to the composition leads to improving the adhesive strength of the rubber produced by vulcanizing the composition. Additionally, NBR serves for enhancing uniform mixing or blending of CSM and PVC. If the content of NBR in the composition exceeds its upper limit, 25% by weight, the outer layer 1b formed thereof is, when exposed to sour gasoline, adversely hardened and deteriorated.

The composition for the outer layer 1b may contain, in addition to the two or three polymers CSM, PVC, NBR, at least one additive commonly used together with a rubber material; such as a reinforcing agent, a filler, a plasticizer, a softener, a vulcanizing agent, and a stabilizer. In particular, the vulcanizing agent may be selected from known vulcanizing agents suitable for vulcanizing CSM; such as dipentamethylenethiuram tetrasulfide (TRA), peroxides, and N,N'-m-phenylene dimaleimide and other maleimides.

The radial thickness of each of the inner and outer layers 1a, 1b is selected at an appropriate value according to desired characteristics of the rubber hose. However, the objects of the present invention is advantageously accomplished by forming the inner layer 1a to have a radial thickness of 0.05 to 1.0 mm and forming the outer layer 1b to have a radial thickness of 0.5 to 2.0 mm.

Radially outwardly of the inner tube 1 (specifically the outer layer 1b thereof), is provided a reinforcing fiber layer 3 constituted in a conventional manner. The reinforcing fiber layer 3 is formed on an circumferential surface of the inner tube 1 by braiding, spiralling or knitting threads consisting essentially of a synthetic fiber such as vinyl on fiber, polyester fiber or aramid fiber, or a natural fiber such as cotton fiber.

Radially outwardly of the reinforcing fiber layer 3, is located an outer tube 2. The outer tube 2 may be formed of a rubber material which has conventionally used for producing rubber hoses. From the viewpoint of weather resistance and oil resistance it is recommended that the outer tube 3 be formed of CSM, CPE or CHC. Meanwhile, it is preferred that the radial thickness of the outer tube 3 fall within the range of 0.7 to 1.5 mm.

The present rubber hose may be manufactured by the known techniques commonly used for producing rubber hoses. The present rubber hose is manufactured by, for example, the following process, in which the respective layers 1a, 1b, 3,2 are superposed on each other in the order of description:

(a) Initially, an appropriate FKM-based composition is extruded by an extruder (not shown) on a rubber or resin mandrel so as to provide an inner layer 1a of an inner tube 1, and subsequently a polymer blend-based composition for an outer layer 1b of the inner tube 1 is extruded on the inner layer 1a so as to provide a double-layer tubular body. However, the inner and outer layers 1a, 1b may be formed on the mandrel by simultaneous extrusions of the two compositions. In addition, an adhesive may be applied between the two layers 1a, 1b.

(b) Next, an adhesive is applied, as needed, to an outer circumferential surface of the obtained tubular body, and subsequently a reinforcing fiber layer 3 is formed on the tubular body by braiding, spiralling or knitting a suitable thread.

(c) Then, an appropriate adhesive (e.g., rubber cement) is applied to an outer circumferential surface of the reinforcing fiber layer 3, and subsequently an appropriate rubber composition is extruded thereon so as to provide an outer tube 2.

(d) Last, the thus obtained laminated tube is vulcanized (or crosslinked) so as to produce an integrally bonded end product, i.e., rubber hose, and subsequently the mandrel is removed from the rubber hose. The vulcanizing temperature is selected at 145° C. to 170° C., while the vulcanizing time is selected at 30 to 90 minutes.

Hereinafter, examples of the rubber hose of the present invention will be shown to illustrate the concepts of the present invention in more detail. However it is to be understood that the present invention is by no means limited to the particular details of the examples. In the following description, part or parts indicate on a weight basis, namely, part(s) by weight, unless otherwise specified.

EXAMPLES

Two invention examples (Hoses No. 1 and No. 2) and two comparative examples (Hoses No. 3 and No. 4), each of which has the same construction as that of the rubber hose shown in FIG. 1, are manufactured by using respective compositions indicated in TABLE I. More specifically described, in the case of Invention Hose No. 1, an inner layer 1a thereof is formed of the FKM composition (indicated below), an outer layer 1b thereof is formed of the CSM-1 composition (indicated in TABLE II), and an outer tube 2 thereof is formed of the CHC composition (indicated below). Meanwhile, Invention Hose No. 2 is manufactured similar to Hose No. 1 except that an outer layer 1b of Hose No. 2 is formed of the CSM-2 composition (indicated in TABLE II).

TABLE I

|  |  | INVENTION HOSES | | COMPARATIVE HOSES | |
|---|---|---|---|---|---|
|  |  | 1 | 2 | 3 | 4 |
| COMPOSITIONS | | | | | |
| INNER TUBE (1) | INNER LAYER(1a) | FKM | FKM | FKM | FKM |
|  | OUTER LAYER(1b) | CSM-1 | CSM-2 | CHC | NBR |
| OUTER TUBE (2) | | CHC | CHC | CHC | CHC |
| ADHESIVE STRENGTH | | | | | |
| BEFORE HEAT AGING (kgf/inch) | | * | * | 9.0 | 5.8 |
| AFTER HEAT AGING (kgf/inch) | | 5.7 | * | 2.3 | 3.2 |
| HEAT RESISTANCE | | O | O | O | X |
| SEALING CHARACTERISTIC | | | | | |
| BEFORE HEAT AGING (kgf/cm$^2$) | | >30 | >30 | >30 | >30 |
| AFTER HEAT AGING (kgf/cm$^2$) | | 25 | >30 | >30 | 5 |

* Not measured since no separation occurs at the interface between the inner and outer layers 1a, 1b at a maximum test load Meanwhile, Comparative Hoses No. 3 and 4 are manufactured similar to Invention Hose No. 1 except that an outer layer 1b of Hose No. 3 is formed of the CHC composition and that an outer layer 1b of Hose No. 4 is formed of the NBR composition (indicated below). The conventional techniques are used for producing four hoses No. 1 through No. 4. Each hose is formed such that the inner diameter thereof is 7 mm, the radial thickness of the inner and outer layers 1a and 1b thereof are 0.6 mm and 1.3 mm, respectively, the reinforcing fiber layer 3 thereof consists of polyester fiber, and the outer tube 2 thereof has a radial thickness of 1.0 mm.

TABLE II indicates the constituents and the contents (parts) thereof in each of the CSM-1 and CSM-2 compositions used for forming the outer layers 1b of Invention Hoses No. 1 and 2, respectively.

TABLE II

|  | CSM-1 | CSM-2 |
|---|---|---|
| CSM POLYMER | 50 | 50 |
| PVC | 25 | 50 |
| NBR POLYMER | 25 | — |
| STEARIC ACID | 1 | 1 |
| MgO | 10 | 10 |
| FEF CARBON BLACK | 10 | 10 |
| CaCO$_3$ | 30 | 30 |
| SILICA | 20 | 20 |
| PLASTICIZER | 25 | 25 |
| VULCANIZING AGENT | 5 | 5 |

The following are the constituents and the contents thereof in each of the FKM, NBR and CHC compositions used for forming the layers or tubes 1a, 1b, 2 of Hoses No. 1 to 4.

| <Constituents> | <Contents (parts)> |
|---|---|
| FKM Composition | |
| FKM Polymer | 100 |
| MgO | 3 |
| Ca(OH)$_2$ | 6 |
| MT Carbon black | 25 |
| NBR Composition | |
| NBR Polymer | 100 |
| Stearic acid | 1 |
| ZnO | 5 |
| MgO | 5 |
| FEF Carbon black | 50 |
| Plasticizer | 15 |
| Vulcanization accelerator | 3.3 |
| Sulphur | 0.5 |
| CHC Composition | |
| CHC Polymer | 100 |
| Stearic acid | 1 |
| MgO | 5 |
| FEF Carbon black | 50 |
| Plasticizer | 5 |
| Vulcanizing agent | 5 |

Each of the thus obtained four hoses (Invention Hoses No. 1 and No. 2; and Comparative Hoses No. 3 and No. 4) is tested for evaluating its adhesive strength at the interface between the inner and outer layers 1a, 1b of the inner tube 1 thereof, together with its heat resistance and sealing characteristic. The test results are indicated in TABLE I. Each of the three evaluation tests is carried out as follows:

Adhesive Strength

Each hose No. 1 to No. 4 is cut to obtain a one inch (about 25 mm) long test piece. The adhesive strength at the interface between the inner and outer layers of the inner tube of each test piece is evaluated by the 180-degree peeling test according to the test protocol K-6301 of JIS (Japanese Industrial Standard). Measurement of the adhesive strength is conducted two times, namely, before and after each test piece is subjected to heat aging or history (120° C.×288 hours).

Heat Resistance

Each hose is cut to obtain a 200 mm long test piece. Each test piece is closed at its ends, and is subjected to heat aging (120° C.×360 hours). After the heat aging, the heat resistance of each test piece is evaluated by bending one of the ends toward the other end over 180 degrees. Symbol O in TABLE II indicates that the test piece is not broken and therefore has an excellent heat resistance, while symbol X indicates that the test piece is broken and therefore the heat resistance thereof is unsatisfactory.

Sealing Characteristic

Each hose is cut to obtain a 500 mm long test piece. One of the ends of each test piece is fitted on the outer circumferential surface of a nipple, and the fitted end is externally tightened around the nipple at a 35% constant compression. Meanwhile, the other end of each test piece is closed, and a pressurized N$_2$ gas is blown into the test piece through the nipple. The sealing characteristic of each test piece is evaluated by measuring a pressure of the N$_2$ gas when the N$_2$ gas begins, in water, to leak from between the hose's fitted end and the nipple. Measurement is conducted two times before and after heat aging (120° C.×288 hours).

As emerges from the test results indicated in TABLE I, each of Invention Hoses No. 1 and No. 2 exhibits an excellent adhesive strength not only before the heat aging and but also after it. Thus the invention hoses are free from the problem of peeling at the interface between the inner and outer layers of the inner tube.

In addition, each of the invention hoses is not broken even after heat aging and thus has a high heat resistance. Furthermore, the invention hoses have a satisfactory sealing characteristic.

On the other hand, Comparative Hose No. 3 whose outer layer 1b is formed of the CHC composition and Comparative Hose No. 4 whose outer layer 1b is formed of the NBR composition exhibit an insufficient adhesive strength at the interface between the inner and outer layers 1a, 1b. Thus, these hoses No. 3 and No. 4 are not free from the possibility of peeling at the interface in question.

While the present invention has been described in detail with reference to the presently preferred embodiment and some examples, it is to be understood that the invention is not limited to the details of the illustrated embodiment or examples, but may be embodied with various changes, improvements and modifications which may occur to those skilled in the ar without departing from the spirit and scope of the invention defined in the appended claims.

What is claimed is:

1. A rubber hose comprising:
   an outer tube formed of a rubber material;
   an inner tube located radially inwardly of said outer tube;
   said inner tube including an inner layer formed of a first composition containing a fluoro rubber as a major constituent thereof, and an outer layer located radially outwardly of said inner layer; and
   said outer layer of said inner tube being formed of a second composition containing as a major constituent thereof a blend of chlorosulphonated polyethylene and polyvinyl chloride.

2. The hose as set forth in claim 1, wherein said second composition contains 40 to 70% by weight of said chlorosulphonated polyethylene, and 25 to 60% by weight of said polyvinyl chloride.

3. The hose as set forth in claim 1, wherein said second composition further contains acrylonitrile-butadiene rubber.

4. The hose as set forth in claim 3, wherein said second composition contains 0 to 25% by weight of said acrylonitrile-butadiene rubber.

5. The hose as set forth in claim 1, wherein said fluoro rubber is selected from the group consisting of a copolymerization product of vinylidene fluoride and 6-fluoropropylene and a copolymerization product of vinylidene fluoride, 4-fluoroethylene and 6-fluoropropylene.

6. The hose as set forth in claim 1, wherein said first composition contains at least one additive.

7. The hose as set forth in claim 1, wherein said second composition contains at least one additive selected from the group consisting of a reinforcing agent, a filler, a plasticizer, a softener, a vulcanizing agent, and a stabilizer.

8. The hose as set forth in claim 7, wherein said vulcanizing agent is selected from the group consisting of dipentamethylenethiuram tetrasulfide, peroxides, and maleimides.

9. The hose as set forth in claim 1, wherein said inner layer of said inner tube has a radial thickness of 0.05 to 1.0 mm.

10. The hose as set forth in claim 1, wherein said outer layer of said inner tube has a radial thickness of 0.5 to 2.0 mm.

11. The hose as set forth in claim 1, wherein said outer tube has a radial thickness of 0.7 to 1.5 mm.

12. The hose as set forth in claim 1, further comprising
    a reinforcing fiber layer interposed between said inner and outer tubes.

* * * * *